United States Patent Office 3,148,975
Patented Sept. 15, 1964

3,148,975
PROCESSING IMPURE URANIUM
Robert J. Teitel, Northridge, Calif., and Gilbert S. Layne, Midland, Mich., assignors to The Dow Chemical Company, Midland, Mich., a corporation of Delaware
No Drawing. Filed Dec. 11, 1961, Ser. No. 158,601
12 Claims. (Cl. 75—84.1)

This invention relates to an improved method for purifying impure uranium or an alloy of uranium and is particularly concerned with a pyrometallurgical process for reducing the level of impurities such as fission products in impure uranium or uranium alloys and recovering the uranium as the metal or as a simple uranium-copper binary alloy.

For the purposes of the specification and claims, the impure uranium or uranium alloy to be subjected to the process of the invention is referred to as uranium metal.

Heretofore, spent nuclear reactor fuel elements and fuel element fabrication plant scrap have been refined by chemical rather than metallurgical processing methods. Chemical methods are subject to certain serious disadvantages such as the use of large quantities of corrosive acid solutions, the handling of large volumes of solutions, the numerous processing steps, the difficulties in handling highly radioactive materials during lengthy processing, the necessity to reduce purified uranium compounds to the metallic state in the process of obtaining refined metal, and the problem of concentrating radioactive waste solutions for disposal and storage. These problems are overcome by the use of the pyrometallurgical method hereinafter disclosed and claimed.

It is an object of the present invention to provide a method widely adaptable to purifying uranium metal and recovering uranium therefrom.

It is another object of the invention to provide a method by which it is inherently possible to refine uranium metal and nearly quantitatively recover uranium therefrom.

It is another object of the invention to provide a method for processing uranium metal and recovering the uranium as metallic uranium or as a uranium alloy.

It is a further object of this invention to provide a method for purifying uranium metal which is readily carried out by remote control.

It is a still further object of this invention to provide a method for purifying uranium metal by which radioactive contaminants removed from the treated uranium metal are recovered in a concentrated, readily disposable form.

Other objects and advantages of the invention will become apparent to those skilled in the art upon becoming familiar with the following description and claims.

This invention is based upon the discovery that by heating a uranium metal together with a copper metal (hereinafter more fully defined) containing at least 70 percent by weight of copper so as to form a molten uranium-copper alloy, and subsequently adding at least 5 weight percent of magnesium to the molten uranium-copper alloy, based on the copper content thereof, a uranium-containing precipitate is formed which can be separated from the mixture by physical methods. Upon processing an impure uranium metal, such as one containing typical fission products, the separated uranium-containing precipitate is found to have a substantially reduced level of impurities, such as the fission products, compared to the starting material.

For the purposes of the specification and claims, a copper metal is defined as a metal consisting of at least 70 percent by weight of copper, up to 15 percent by weight of magnesium, and up to 15 percent by weight of zinc.

In this field of endeavor, it is usually an economic necessity to obtain good uranium recoveries. Uranium losses in the present process occur (1) if all the uranium is not taken up initially by the copper metal, or (2) if the uranium is not quantitatively precipitated from an alloy with copper metal according to the process.

Thus, it is usually essential that the uranium content of the impure uranium metal forms an alloy with the copper metal. Uranium metal which may be processed according to the invention includes uranium, as well as uranium alloys which are substantially completely alloyable with copper metal. If the uranium metal is not entirely miscible with the copper metal at working temperatures that are reasonable to use in working with available containers formed of molten metal-resistant materials of construction, it must at least be corrodible by the copper metal so that the uranium content can be taken up by the copper metal. It is desirable that not more than about 10 percent by weight of the uranium alloy fails to alloy with the copper metal at the alloying or corroding temperature (usually 700°–1000° C.), thus fairly assuring complete dissolution or extraction of the uranium values in the impure metal.

In order to obtain efficient recoveries of uranium (99 percent or better), the uranium metal used as starting material should contain at least about 0.3 percent by weight of uranium.

Metals which are soluble in the copper solvent used to dissolve the uranium and which coprecipitate markedly with uranium in the present process, for example, ruthenium and strontium, are generally not separated from uranium according to the present invention. Unless such metals are desired, or at least tolerated, in the final uranium product, uranium metals containing such impurities in substantial amounts (more than a trace) are less advantageously treated according to the present process.

In carrying out the process of the invention, the uranium metal is mechanically reduced and dried, and degreased, if indicated, and then heated together with an amount of a copper metal containing from 4 to about 20 parts of copper per part of uranium in the uranium metal. Desirably, heating is carried out in an inert atmosphere to avoid oxidation of uranium, a readily oxidized metal. If the uranium metal consists of spent nuclear fuel, provision should be made to collect volatile fission products released as the metal melts.

An example of a suitable apparatus for use in carrying out the method of the invention is described in a copending application, Serial No. 825,389, filed July 2, 1959, now U.S. Patent 3,053,650.

The copper metal, if it consists of 95 to 100 percent of copper, will not melt at temperatures lower than about 100 centigrade degrees below the melting temperature of pure copper (1083° C.). While the copper alloys contemplated for use in this invention, containing less than about 95 percent of copper, generally melt appreciably lower than 1000° C., the formation of such a copper alloy from a mixture of discrete particles of copper and of uranium is often slow at temperatures lower than 900°–1000° C., unless the metals are finely divided, e.g., 4–10 mesh or finer. For this reason, it is often preferred to employ a copper metal which is alloyed with up to 15 weight percent of magnesium, or with up to 15 weight percent of zinc, or with up to 30 weight percent of mixtures of these metals, thereby making possible lower operating temperatures. If the uranium metal being processed already contains one or both of magnesium or zinc, each such metal must be used in limited amount or excluded from the copper metal during this initial alloying step, so that the above limiting relation of not more than 15 parts of each said metal per 100 parts of copper is not exceeded, else subsequent uranium recoveries will tend to be adversely affected.

If the uranium metal is not all alloyed or "dissolved" in the molten copper metal, and solid portions or particles remain, a greater quantity of copper metal may be added as required to take up any uranium held by the solid material. Otherwise, the solids are separated by one of the known methods, such as, filtration, centrifugation or settling, as well understood in the pyrometallurgical art, at a temperature above the solidification temperature of the resulting copper alloy, generally in the range of 700°–1000° C., or higher if desired and if a suitably corrosion resistant container material is available.

Solids-free uranium-copper alloy, containing up to 25 percent by weight of uranium, and at least 75 percent by weight of a copper metal comprising at least 70 percent by weight of copper and up to 1 part of magnesium per 4 parts of copper, and up to 1 part of zinc per 4 parts of copper, but mixtures of the metals magnesium and zinc not exceeding 30 percent by weight of the copper metal, is heated with magnesium to bring about formation of a molten magnesium-copper alloy and precipitation of uranium or a copper-uranium intermetallic compound such as $UCu_5$. The amount of magnesium used, by weight, is equal to at least 5 percent by weight of the copper present, and preferably from 10 to 100 percent by weight (0.1 to 1 part by weight per part of copper) in order to obtain better uranium recovery, though more magnesium may be used, if desired. With higher magnesium additions, uranium recovery efficiency tends to be lowered, although purification of the uranium may be, and usually is, more complete.

Upon the addition of sufficient magnesium to provide 0.05 to about 0.15 part by weight of magnesium per part of copper present, uranium tends to precipitate as a uranium-copper intermetallic compound, usually $UCu_5$. Upon the addition of about 0.15 to 1 part by weight, or more, of magnesium per part of copper present, uranium tends to precipitate as uranium without the formation of an intermetallic compound.

The uranium-copper alloy and magnesium may be brought together in any way suitable, i.e., with either one or both of the alloy and magnesium in molten or solidied form, and heated together under an inert atmosphere at a temperature sufficient for a melt of magnesium and copper to form in a reasonable time, such as one to two hours. Generally, a temperature in the range of about 700°–900° C. is satisfactory. At temperatures above about 950° C., the volatility of magnesium tends to become a problem. During this time, a melt of magnesium-copper alloy is formed and at least a part of the uranium is precipitated. The the metal mixture is allowed to cool to a temperature slightly above the solidification temperature of the magnesium-copper alloy and held there for one hour or more, and preferably two to six hours, to permit additional precipitation of uranium before separating the uranium-containing precipitate, thus allowing better uranium recovery efficiencies.

Solidication of copper-magnesium alloys generally occurs in the range of 500°–1050° C. Pure copper melts at 1083° C., pure magnesium at 650° C., copper-magnesium alloy consisting of 90 percent by weight copper, the balance magnesium, melts at about 730° C., while a copper-magnesium alloy consisting of about 65 percent by weight of copper, the balance magnesium, melts at about 555° C.

The precipitated uranium-containing solids, which may consist of uranium or a uranium-copper intermetallic compound such as $UCu_5$, may be recovered by centrifugation; by settling, solidification as a casting and cutting off of the appropriate lower portion of the casting; or by filtration through a graphite frit filter, as in the apparatus described in the said copending application. The filtration method generally requires the use of only a moderate pressure differential (e.g., about 22 p.s.i.) across the graphite frit filter, and has the advantage that the uranium precipitate may be washed on the filter to remove metals other than uranium, i.e., residual melt consisting mainly of magnesium and copper or copper plus at least one of zinc or magnesium. Removal of the residual melt is desirable since it contains impurities extracted from the uranium. If the precipitate is $UCu_5$, the compound may be dissociated and the copper content thereof removed at the same time residual melt is being removed by washing.

Washing is carried out by contacting the precipitate with magnesium for a period of 15 minutes to an hour or more, and then drawing the molten magnesium through the filter. Alloys of magnesium with zinc or cadmium can also be used, wherein the magnesium content is at least 50 percent. If the zinc or cadmium content is higher than 50 percent, intermetallic compounds form with a concomitant loss in washing efficiency and the loss of uranium values to the solvent is increased.

For the purposes of the specification and claims, magnesium and magnesium alloys containing at least 50 percent of magnesium and either zinc or cadmium are hereinafter referred to as magnesium metal.

Generally, from 30 to 100 parts by weight magnesium metal per part of uranium provides an adequate volume of magnesium metal to wash out most of the original magnesium-copper melt and to dissociate any uranium-copper intermetallic compound.

If desired, the washing step may be repeated one or more times to obtain more complete removal of copper and coprecipitated metals. Each wash, however, results in a small but finite loss of uranium to the magnesium metal.

Washing may also be carried out by contacting the uranium precipitate with molten magnesium metal in a crucible or pot in which the mixture may be stirred, or agitated, as by gas sparging, and after allowing the uranium to settle, the supernatant melt may be removed by allowing the melt to solidify and then cutting off the settled layer. This process is relatively simple, but less complete separations of melt and precipitate are obtained.

The washed precipitate of uranium is freed of magnesium metal by distilling off the magnesium metal, preferably at reduced pressure, as well understood in the art, and as described in the said copending application, leaving a purified uranium in particulate form which may be arc melted to massive form, or readily alloyed with metals used in making suitable fuel alloys, e.g., metals such as chromium or aluminum.

The solubility of uranium in several copper-magnesium alloys was determined as follows:

The requisite amounts of copper and magnesium were placed in a graphite crucible and heated under an inert atmosphere at a temperature of 800° C. until alloying was complete. Alloying of the two metals takes place at surprisingly low temperatures. For example, 196 grams of a 1:1 copper-magnesium alloy was successfully prepared by heating the two metals together at 675° C. for 3.5 hours.

An amount of uranium, assuredly above the solubility limit, was added to the copper-magnesium alloy and heated with the alloy under an inert atmosphere at 800° C. for three hours. The temperature of the mixture was held constant at a given temperature for at least one hour, then a sample was taken by inserting an inverted impervious graphite cup, having a graphite frit filter press-fitted in the throat of the cup, into the melt with the filter side down, while the gas pressure above the melt was increased. Solids-free melt entered the cup and the cup was removed through a gas lock arrangement. The cup and contents were cooled and broken up to retrieve the sample for analysis. This sampling process was repeated at each test temperature after equilibrating the mixture for about an hour at the test temperature. The solubility of uranium in three of the copper-magnesium alloys at three different temperatures is listed in the following table:

| Wt. Percent Magnesium, Bal. Copper | Solubility of Uranium, Wt. Percent | Temperature, °C. |
|---|---|---|
| 10 | 1.45 | 850 |
| 10 | 1.2 | 750 |
| 35 | .021 | 850 |
| 35 | .015 | 750 |
| 35 | .0075 | 600 |
| 70 | .0073 | 850 |
| 70 | .0060 | 750 |
| 70 | .0036 | 600 |

While the following examples serve to illustrate the process of the invention, the process is not to be construed as limited thereto.

*Example 1*

A copper-magnesium alloy consisting of 90 percent by weight of copper and the balance magnesium (90 grams of copper, 10 grams of magnesium) was prepared by heating the two metals in a graphite crucible under an inert atmosphere in a furnace. Uranium (5 grams) was added to make about a 5 percent uranium alloy. This alloy was placed above a graphite frit filter in a graphite filter sleeve and heated to 825° C. under an inert atmosphere in a furnace for two hours. The resulting alloy was cooled to 650° C. and 199.5 grams of magnesium were added to the melt to increase the magnesium concentration to 70 weight percent. The mixture was heated to 790° C. and maintained at that temperature for one hour. The alloy was allowed to cool overnight. The alloy was then reheated to 650° C., stirred and then cooled to 550° C. After maintaining the mixture at 550° C. for one hour, the gas pressure above the melt was increased to force the molten portion of the mixture through the filter, solids being retained. The furnace and contents were allowed to cool to room temperature and the filtrate was removed from a graphite crucible below the filter sleeve. Magnesium (200 grams) was placed on the residue above the filter and the graphite apparatus was reassembled in the furnace and heated to 800° C. The molten magnesium and the residue on the filter were mixed by gas sparging through the filter and the melt for about one hour. The temperature of the apparatus was then adjusted to 675° C. and held at that temperature for one hour. The gas pressure above the filter was again increased and the molten metal forced through the filter. The apparatus was allowed to cool and was then dismantled, and both the residue and the filtrate were examined metallographically and chemically. The analyses of the residue of the filtrate and of the magnesium wash were as follows:

| Segment | Wt. (gms.) | Composition (percent by wt.) | | |
|---|---|---|---|---|
| | | U | Cu | Mg |
| Residue | 4.5 | 61.6 | 0.53 | 37.9 |
| Filtrate | 287.2 | .0013 | 29.85 | 68.8 |
| Mg Wash | 200.6 | .0010 | 1.67 | 97.5 |

The results indicate that only 0.2 percent of the uranium was lost to the filtrate. Most of the uranium retained in the residue was in the form of uranium metal. The magnesium retained in the residue is readily removed by distillation.

*Example 2*

To demonstrate the reduction of contamination of uranium during the process of the invention, an alloy was prepared consisting of 4 weight percent of lightly irradiated uranium and 20 parts per million each of ruthenium, zirconium, strontium and cerium, eight weight percent of magnesium, and the balance copper. The alloy was prepared by heating the constituents together at a temperature of 850° C. for two hours and filtering the resulting alloy. A sample of the filtered alloy was set aside for analysis. To this initial alloy, sufficient additional magnesium was added to produce an alloy consisting of 50 weight percent magnesium. The mixture was heated to 830° C., held at that temperature for 1.5 hours, then cooled to 565° C. After the mixture had stood quiescent for two hours, the melt was filtered off through a graphite frit filter. After allowing the apparatus to cool to room temperature, a sample of the filtrate was taken and analyzed. The analysis of the melt prior to and subsequent to the magnesium addition are listed as follows:

| Sample | Wet Chemical Analysis, Wt. Percent | | | Radiochemical Analysis in Counts per min. | | | |
|---|---|---|---|---|---|---|---|
| | Cu | Mg | U | Zr | Ru | Sr | Ce |
| Liquid Phase prior to Mg addition | 88.4 | 7.59 | 4.00 | 1,880 | 3,520 | 120 | 70,000 |
| Liquid Phase after Mg addition | 52.6 | 47.4 | .0035 | 10 | 122 | 10 | 34,700 |

Interpretation of the data in the foregoing table indicates the following distributions between the filtrate and the residue on the filter.

| Fraction | Distribution in percent of total | | | | |
|---|---|---|---|---|---|
| | U | Zr | Ru | Sr | Ce |
| Filtrate | .13 | .84 | 5.4 | 13.1 | 78 |
| Residue on Filter | 99.9 | 99.2 | 94.6 | 86.9 | 22 |

These results indicate that the rare earth fission products as represented here by cerium are not highly coprecipitated with uranium. The noble fission products (i.e., Zr and Ru) are more highly coprecipitated than is cerium or strontium. These results indicate that appreciable separation from uranium of rare earth type fission products similar to cerium is readily achieved.

*Example 3*

The mutual solubilities of ruthenium, zirconium and molybdenum in uranium-copper alloy was determined by adding 2 weight percent each of ruthenium, zirconium and molybdenum to a uranium-copper alloy consisting of 21.7 weight percent of uranium and the balance copper. The mixture was heated to and maintained at a temperature of 1010° C. for several hours under an inert atmosphere. Then the melt was sampled through an inverted sampling cup having a graphite frit filter press-fitted in the throat thereof. Analysis of the sample indicates that the solubilities in this uranium-copper alloy at 1010° C. are: 0.16 weight percent of zirconium, 0.12 weight percent of molybdenum, and about 1.2 weight percent of ruthenium. These results indicate that molybdenum and zirconium can be largely separated from uranium alloy on taking up the alloy in molten copper metal, while ruthenium is largely taken up, along with the uranium, by the molten copper metal.

Having now described the process of the present invention, other embodiments thereof will at once be apparent to those skilled in the art, and the scope of the invention is to be considered limited only by the scope of the claims hereinafter appended.

We claim:
1. In a method of purifying an impure uranium metal selected from the group consisting of uranium and alloys thereof, the steps which comprise: heating the uranium metal with a copper metal selected from the group consisting of copper and copper magnesium alloys consisting of at least 70 weight percent of copper and up to about 15 weight percent of magnesium, whereby the uranium metal and the copper metal are made molten and entirely mutually miscible, and heating the melt together with sufficient magnesium to form a molten magnesium-copper melt and to cause precipitation of a uranium-containing solid therefrom.

2. In a method of purifying an impure uranium metal selected from the group consisting of uranium and alloys thereof, the steps which comprise: heating the uranium metal with a copper metal selected from the group consisting of copper and copper-magnesium alloys consisting of at least 70 weight percent of copper and up to about 15 weight percent of magnesium, to a temperature above about 700° C., whereby the uranium metal and the copper metal are made molten and entirely mutually miscible, and heating the melt together with sufficient magnesium to form a molten magnesium-copper melt and to cause precipitation of a uranium-containing solid therefrom.

3. In a method of purifying an impure uranium metal selected from the group consisting of uranium and alloys thereof, the steps which comprise: heating the uranium metal with a copper metal selected from the group consisting of copper and copper-magnesium alloys consisting of at least 70 weight percent of copper and up to about 15 weight percent of magnesium, to a temperature above about 700° C., whereby the uranium metal and the copper metal are made molten and entirely mutually miscible, and heating the melt together with sufficient magnesium to form a molten magnesium-copper melt and to cause precipitation of a uranium-containing solid therefrom, said uranium-containing solid being selected from the group consisting of uranium and uranium-copper intermetallic compound.

4. The method of purifying an impure uranium metal which comprises: heating the uranium metal with a copper metal selected from the group consisting of copper and copper-magnesium alloys consisting of at least 70 weight percent of copper and up to about 15 weight percent of magnesium to a temperature above about 700° C., whereby the uranium metal and the copper metal are made molten and entirely mutually miscible, and heating the so-formed melt together with sufficient magnesium to form a molten magnesium-copper melt and to cause precipitation of a uranium-containing solid therefrom, and separating said uranium-containing solid from the concomitant melt.

5. The method of purifying an impure uranium metal which comprises: heating the uranium metal with a copper metal selected from the group consisting of copper and copper-magnesium alloys consisting of at least 70 weight percent of copper and up to about 15 weight percent of magnesium to a temperature above about 800° C., whereby the uranium metal and the copper metal are made molten and entirely mutually miscible, and heating the so-formed melt together with molten magnesium-copper to form a melt and to cause precipitation of a uranium-containing solid therefrom and heating the separated solid to distill magnesium therefrom.

6. The method of purifying an impure uranium metal which comprises: heating the uranium metal with a copper metal selected from the group consisting of copper and copper-magnesium alloys consisting of at least 70 weight percent of copper and up to about 15 weight percent of magnesium to a temperature above about 800° C., whereby the uranium metal and the copper metal are made molten and entirely mutually miscible, and heating the so-formed melt together with sufficient magnesium to cause formation of a molten magnesium-copper alloy and precipitation of a uranium-containing solid therefrom, and separating said uranium-containing solid from the concomitant melt, washing said separated uranium-containing solid with molten magnesium and heating the washed solid to distill magnesium therefrom.

7. The method of purifying an impure uranium metal selected from the group consisting of uranium and uranium alloys which comprises: heating the uranium metal with a copper metal selected from the group consisting of copper and binary copper-magnesium alloys consisting of at least 70 weight percent of copper and up to about 15 weight percent of magnesium to a temperature above about 700° C., whereby the uranium metal and copper metal become alloyed and molten; separating unfused solids from the molten alloy; and heating the so-formed melt together with sufficient magnesium to cause formation of a molten magnesium-copper alloy and precipitation of a uranium-containing solid therefrom.

8. The method of purifying an impure uranium metal selected from the group consisting of uranium and uranium alloys which comprises: heating the uranium metal with a copper metal which consists of at least 70 weight percent of copper and up to 15 weight percent of magnesium and up to 15 weight percent of zinc, to a temperature above about 700° C., whereby the uranium metal and copper metal become alloyed and molten; separating unfused solids from the so-formed molten alloy; heating the so-formed alloy together with sufficient magnesium to cause formation of a molten magnesium-copper alloy and precipitation of uranium-containing solids therefrom; and separating the uranium-containing solids from the concomitant melt.

9. The method of purifying an impure uranium metal selected from the group consisting of uranium and uranium alloys which comprises: heating the uranium metal to a temperature above about 800° C., together with an amount of a copper metal which contains from 4 to 20 parts by weight of copper per part of uranium metal, whereby the uranium metal and copper metal become alloyed and molten, said copper metal consisting of at least 70 weight percent of copper and up to 15 weight percent of magnesium and up to 15 weight percent of zinc; separating undissolved solids from the so-formed molten alloy; heating the so-formed alloy with from 0.5 to 1 part of magnesium per part by weight of copper in the alloy, thereby causing formation of a molten magnesium-copper alloy and precipitation of uranium-containing solids from the molten alloy; and separating the uranium-containing solids from the concomitant molten alloy.

10. The method of purifying an impure uranium metal selected from the group consisting of uranium and uranium alloys which comprises: heating one part by weight of the uranium metal with from 4 to 20 parts by weight of copper to a temperature above about 1000° C., whereby the uranium metal and copper become alloyed and molten; separating undissolved solids from the molten alloy; heating the alloy with from 0.05 to 1 part by weight of magnesium per part by weight of copper in the melt thereby causing precipitation of uranium-containing solids from the melt; and separating the uranium-containing solids from the concomitant melt.

11. The method of purifying an impure uranium metal selected from the group consisting of uranium and uranium alloys which comprises: heating the uranium metal to a temperature above about 800° C., together with an amount of a copper metal which contains from 4 to 20 parts by weight of copper per part of uranium metal, whereby the uranium metal and copper metal become alloyed and molten, said copper metal consisting of at least 70 weight percent of copper and up to 15 weight percent of magnesium and up to 15 weight percent of zinc; separating undissolved solids from the molten alloy; heating the alloy with from 0.05 to about 0.15 part by weight of magnesium per part by weight of copper in the melt thereby causing precipitation of uranium-copper intermetallic compound from the melt; and separating the uranium-copper intermetallic compound from the concomitant melt.

12. The method of purifying an impure uranium metal selected from the group consisting of uranium and uranium alloys which comprises: heating the uranium metal to a temperature above about 800° C., together with an amount of a copper metal which contains from 4 to 20 parts by weight of copper per part of uranium metal, whereby the uranium metal and the copper metal become alloyed and molten, said copper metal consisting of at least 70 weight percent of copper and up to 15 weight percent of magnesium and up to 15 weight percent of zinc; separating undissolved solids from the molten alloy; heating the alloy with from 0.15 to 1 part by weight of magnesium per part by weight of copper in the melt thereby causing precipitation of uranium from the melt; and separating the uranium from the concomitant melt.

References Cited in the file of this patent
UNITED STATES PATENTS

| | | |
|---|---|---|
| 2,778,730 | Spedding et al. | Jan. 22, 1957 |
| 2,934,425 | Knighton et al. | Apr. 26, 1960 |
| 3,034,889 | Spedding et al. | May 15, 1962 |
| 3,053,650 | Teitel | Sept. 11, 1962 |